US012688532B2

(12) United States Patent
Boshmaf et al.

(10) Patent No.: US 12,688,532 B2
(45) Date of Patent: Jul. 21, 2026

(54) SMART CONTRACT SECURITY AUDITING

(71) Applicant: Qatar Foundation for Education, Science and Community Development, Doha (QA)

(72) Inventors: Yazan Boshmaf, Doha (QA); Sajitha Liyanage, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 0 days.

(21) Appl. No.: 18/535,740

(22) Filed: Dec. 11, 2023

(65) Prior Publication Data

US 2024/0202824 A1 Jun. 20, 2024

Related U.S. Application Data

(60) Provisional application No. 63/432,570, filed on Dec. 14, 2022.

(51) Int. Cl.
*G06Q 40/04* (2012.01)
*G06Q 20/40* (2012.01)

(52) U.S. Cl.
CPC ......... *G06Q 40/04* (2013.01); *G06Q 20/4016* (2013.01); *G06Q 2220/00* (2013.01)

(58) Field of Classification Search
CPC . H04L 63/1433; G06F 21/577; G06F 18/217; G06Q 20/4016; G06Q 40/04; G06Q 2220/00
See application file for complete search history.

(56) References Cited

U.S. PATENT DOCUMENTS

| | | | |
|---|---|---|---|
| 2005/0114152 A1* | 5/2005 | Lopez ............... | G06Q 10/0637 705/7.36 |
| 2021/0109919 A1* | 4/2021 | Raj .......................... | G06F 16/27 |
| 2021/0110047 A1* | 4/2021 | Fang ...................... | G06N 20/00 |

FOREIGN PATENT DOCUMENTS

| | | | | |
|---|---|---|---|---|
| KR | 2020094618 A | * | 8/2020 | ........... G06F 21/563 |

OTHER PUBLICATIONS

N. Fatima Samreen and M. H. Alalfi, "Reentrancy Vulnerability Identification in Ethereum Smart Contracts," 2020 IEEE International Workshop on Blockchain Oriented Software Engineering (IWBOSE), London, ON, Canada, 2020, pp. 22-29, doi: 10.1109/IWBOSE50093.2020.9050260. keywords: {Conferences;Smart contracts;Computer bugs; Decentralized applications; Consensus protocol; Security;Software engineering}, (4 pages).
Brent, et al.; "Vandal: A Scalable Security Analysis Framework for Smart Contracts"; Sep. 11, 2018; (10 pages).
Lutz, et al.; "ESCORT: Ethereum Smart COntRacTs Vulnerability Detection using Deep Neural Network and Transfer Learning"; Mar. 23, 2021; (5 pages).
Lu, et al.; "NeuCheck: A more practical Ethereum smart contract security analysis tool"; Aug. 28, 2019; (7 pages).

* cited by examiner

*Primary Examiner* — Hao Fu
(74) *Attorney, Agent, or Firm* — K&L Gates LLP

(57) ABSTRACT

Smart contract auditing may be provided by: receiving a request to audit a prospective smart contract; executing a smart contracts auditing model; extracting raw data from at least one blockchain using the smart contracts auditing model; analyzing the raw data using at least two security analyzers; aggregating the output of the at least two security analyzers according to an aggregator; and generating a smart contracts security report from the aggregated output for the prospective smart contract, which includes a smart contracts security score.

14 Claims, 4 Drawing Sheets

100

SMART CONTRACT SECURITY AUDITING

CROSS-REFERENCES TO RELATED APPLICATIONS

The present disclosure claims the benefit of U.S. Provisional Patent Application No. 63/432,570 entitled "SYSTEM AND METHODS FOR SMART CONTRACT SECURITY AUDITING" and filed on Dec. 14, 2022, which is incorporated herein by reference in its entirety

BACKGROUND

A smart contract is a collection of code and the data therefor that resides at a specific location on a blockchain. Smart contracts can define rules and automatically enforce those rules via associated code. Smart contracts cannot be deleted by default, and interactions or transactions with a smart contract are irreversible. Some of the main applications of smart contracts include cryptocurrencies, digital asset exchanges, and decentralized finance (DeFi), including lending, staking, and payments.

As smart contracts can hold large quantities of valuable digital assets and have immutable logic, smart contracts have become a target for security attacks that exploit existing vulnerabilities in the deployed code of these smart contracts. Assets stolen from smart contracts are generally irrecoverable and incredibly difficult to track.

Given the value of some digital assets held by smart contracts and the difficulty of recovering assets stolen from smart contracts, security vulnerabilities of smart contracts need to be analyzed and reduced. While automated tools to analyze the security of smart contracts have been proposed, these tools are usually unmaintained and are difficult to integrate into development workflows. As a result, smart contracts developers and analysts resort to manual audits of the smart contract code, an undertaking which is costly in time and resources.

Accordingly, a need exists for a system that efficiently and effectively determines the vulnerabilities of smart contracts and that can be efficiently integrated into development workflows.

SUMMARY

The present disclosure provides new and innovative systems and methods for smart contracts auditing. The present disclosure provides for a smart contracts auditing system containing a smart contracts auditing model that extracts smart contract data from a blockchain, analyzes the smart contract data using more than one security analyzer, aggregates the output of the security analyzers according to an aggregator, and generates a security report, including an explainable, smart contract security score.

A smart contracts auditing system may include a memory and a processor in communication with the memory, configured to execute a smart contracts auditing model, which extracts raw smart contract data from at least one blockchain. The smart contracts auditing model analyzes the extracted data using more than one security analyzer. The smart contracts auditing model aggregates the output of the security analyzers according to an aggregator. From this aggregated output, the smart contracts auditing model generates a smart contracts security report, which includes a smart contracts security score, which corresponds to the number of vulnerabilities identified in a given smart contract.

A smart contracts auditing device may include a non-transitory computer readable storage medium that includes instructions that, when executed by a processor, perform operations including receiving a request to audit a prospective smart contract; executing a smart contracts auditing model; extracting raw data from at least one blockchain using the smart contracts auditing model; analyzing the raw data using at least two security analyzers; aggregating outputs from the at least two security analyzers according to an aggregator; and generating a smart contracts security report from the outputs as aggregated for the prospective smart contract, which includes a smart contracts security score.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides new and innovative systems and methods for smart contracts security auditing.

Figure 1:
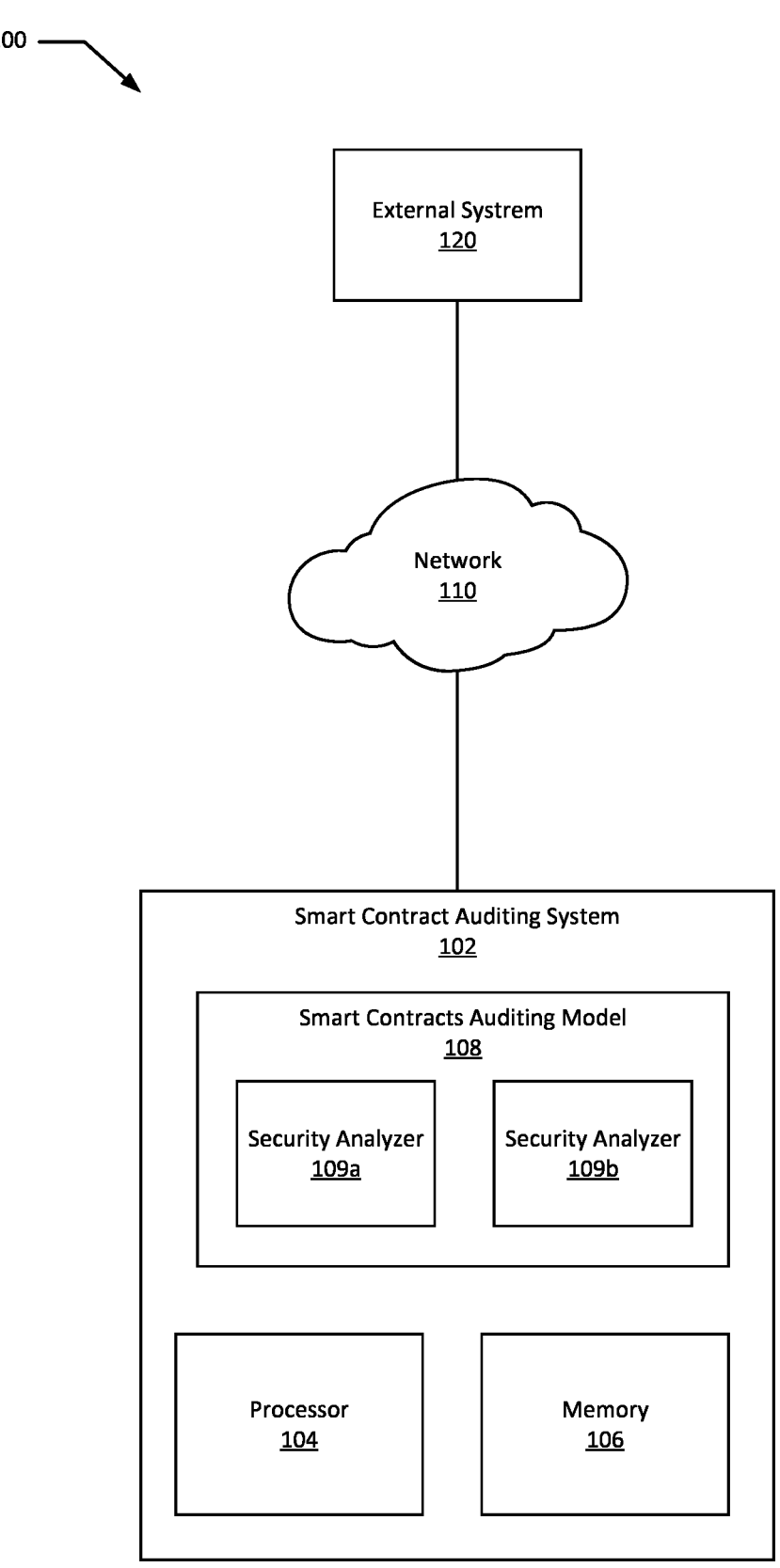
FIG. 1 illustrates an example system for smart contracts security auditing, according to embodiments of the present disclosure.

FIG. 1 illustrates an example system 100 for smart contracts security auditing, according to embodiments of the present disclosure. The system 100 may include a smart contracts security auditing system 102. In various aspects, the smart contracts security auditing system 102 may include a processor 104 in communication with a memory 106. The processor 104 may be a Central Processing Unit (CPU), an Application Specific Integrated Circuit (ASIC), or any other similar device. The smart contracts security auditing system 102 may include a smart contracts security auditing model 108. The smart contracts auditing model 108 may include at least one security analyzer 109*a*, 109*b* for analyzing the security of extracted smart contract data.

The processor 104 may be any processing unit capable of performing the operations and procedures described in the present disclosure. In various embodiments, the processor 104 can represent a single processor, multiple processors, a processor with multiple cores, and combinations thereof.

The memory 106 is an apparatus that may be either volatile or non-volatile memory and may include RAM, flash, cache, disk drives, and other computer readable memory storage devices. Although shown as a single entity, the memory 106 may be divided into different memory storage elements such as RAM and one or more hard disk drives. As used herein, the memory 106 is an example of a device that includes computer-readable storage media, and is not to be interpreted as transmission media or signals per se.

As shown, the memory 106 includes various instructions that are executable by the processor 104 to provide an operating system to manage various features of the auditing system 102 and one or more programs to provide various functionalities to users of the auditing system 102, which include one or more of the features and functionalities described in the present disclosure. One of ordinary skill in the relevant art will recognize that different approaches can be taken in selecting or designing a program to perform the operations described herein, including choice of programming language, the operating system used by the computing device, and the architecture of the processor 104 and memory 106. Accordingly, the person of ordinary skill in the relevant art will be able to select or design an appropriate program based on the details provided in the present disclosure.

Accordingly, the auditing system 102 is an example computing device or computing system that includes a processor 104 and a memory 106 that includes instructions that (when executed by the processor 104) perform various embodiments of the present disclosure. Similarly, the memory 106 is an apparatus that includes instructions that, when executed by a processor 104, perform various embodiments of the present disclosure.

The smart contracts auditing system 102 may be in communication with an external system 120 over a network 110. The network 110 can include, for example, the Internet or some other data network, including, but not limited to, any suitable wide area network or local area network. For example, the external system 120 may include various client devices that access the smart contracts auditing system 102 over the network 110, such that the smart contracts auditing system 102 is deployed as a cloud-based application or service.

Figure 2:
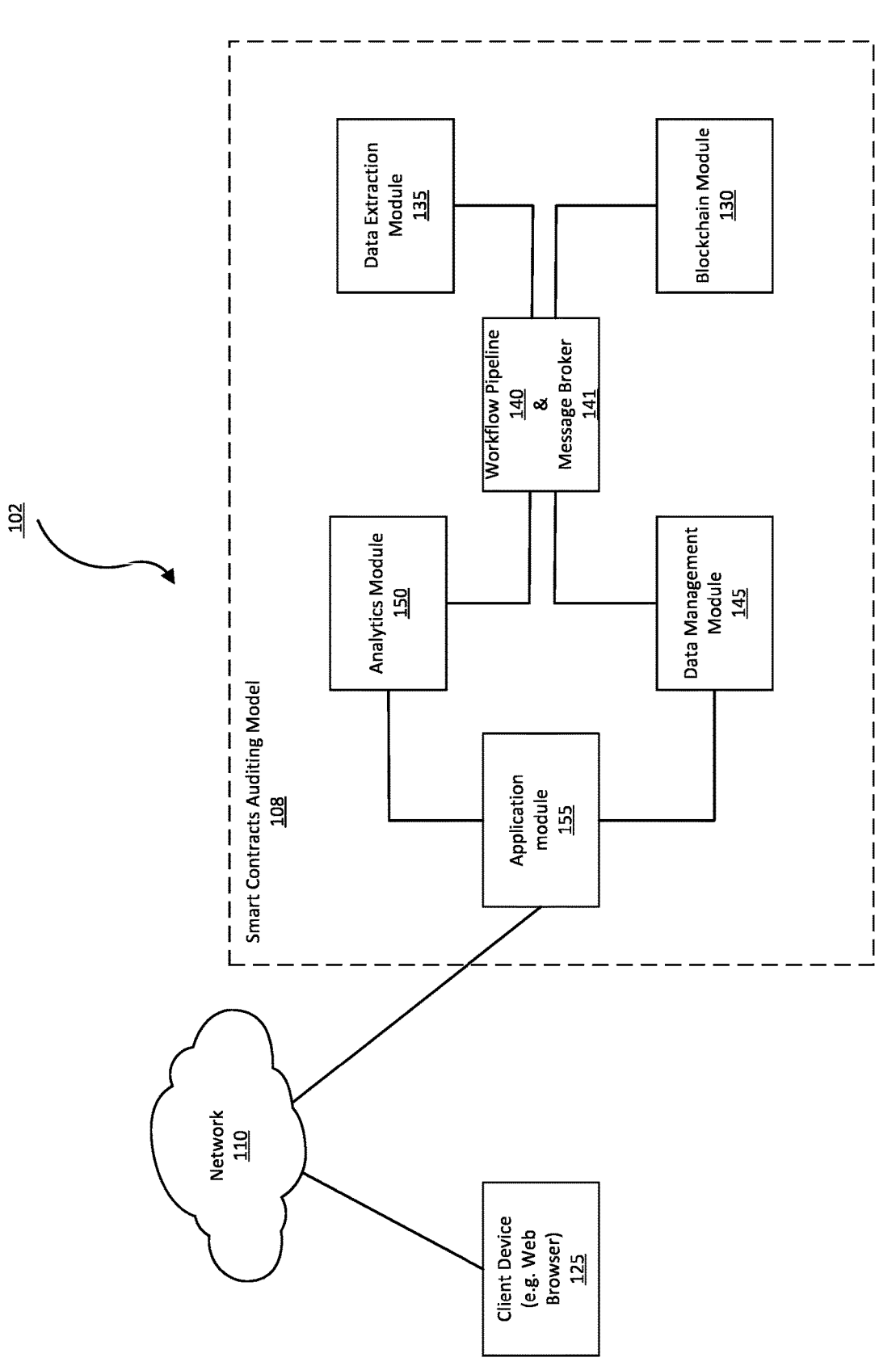
FIG. 2 illustrates an example embodiment of a smart contracts security auditing system, according to embodiments of the present disclosure.

FIG. 2 illustrates an example smart contracts auditing system 102, according to embodiments of the present disclosure. The smart contracts auditing system 102 may be deployed as a cloud-based service with a client device 125 accessing the smart contracts auditing model 108 over a network 110. In some embodiments, a smart contracts auditing model 108 may include a blockchain module 130 which extracts the raw data from at least one blockchain. The blockchain module may also parse the extracted data into a unified format. The smart contracts auditing model 108 may include a data extraction module 135, which extracts metadata from the smart contracts data retrieved from at least one blockchain. The smart contracts auditing model 108 may also contain a data management module 145, which stores the parsed data in a unified format such that the parsed data can be queried and is usable to other parts of the smart contracts auditing system 102.

Additionally, an example smart contracts auditing model 108 may include an analytics module 150 that includes more than one security analyzer. The analytics module 150 may analyze extracted smart code data using a multiple security analyzers, and aggregate the output of the analyzers according to a rules-based expert system. The analytics module 150 uses this aggregated analysis to generate a smart contracts security report, which includes a smart contracts security score, which is a single value that corresponds to easy-to-understand level of security vulnerability present with in an analyzed smart contract.

A smart contracts auditing model 108 may also include an applications module 155 via which a client device interacts with the rest of the smart contracts auditing system 102. For example, an applications module 155 may include an Applicant Program Interface (API) that allows users on client devices 125 to search a database of the data management module 145 for a specified smart contract in order to analyze the vulnerabilities of the specified smart contract via the analytics module 150. In various embodiments, these vulnerabilities may be classified into different weakness-types, such as, for example reentrancy, arithmetic issues, and parity wallets. Additionally, the various internal modules of a smart contracts auditing model 108 may communicate and operate with each other using a workflow pipeline 140 and a message broker 141, which ensure proper operation of the smart contracts auditing model 108 by prioritizing and deprioritizing different messages sent between the various components of the smart contracts auditing model 108.

Figure 3:
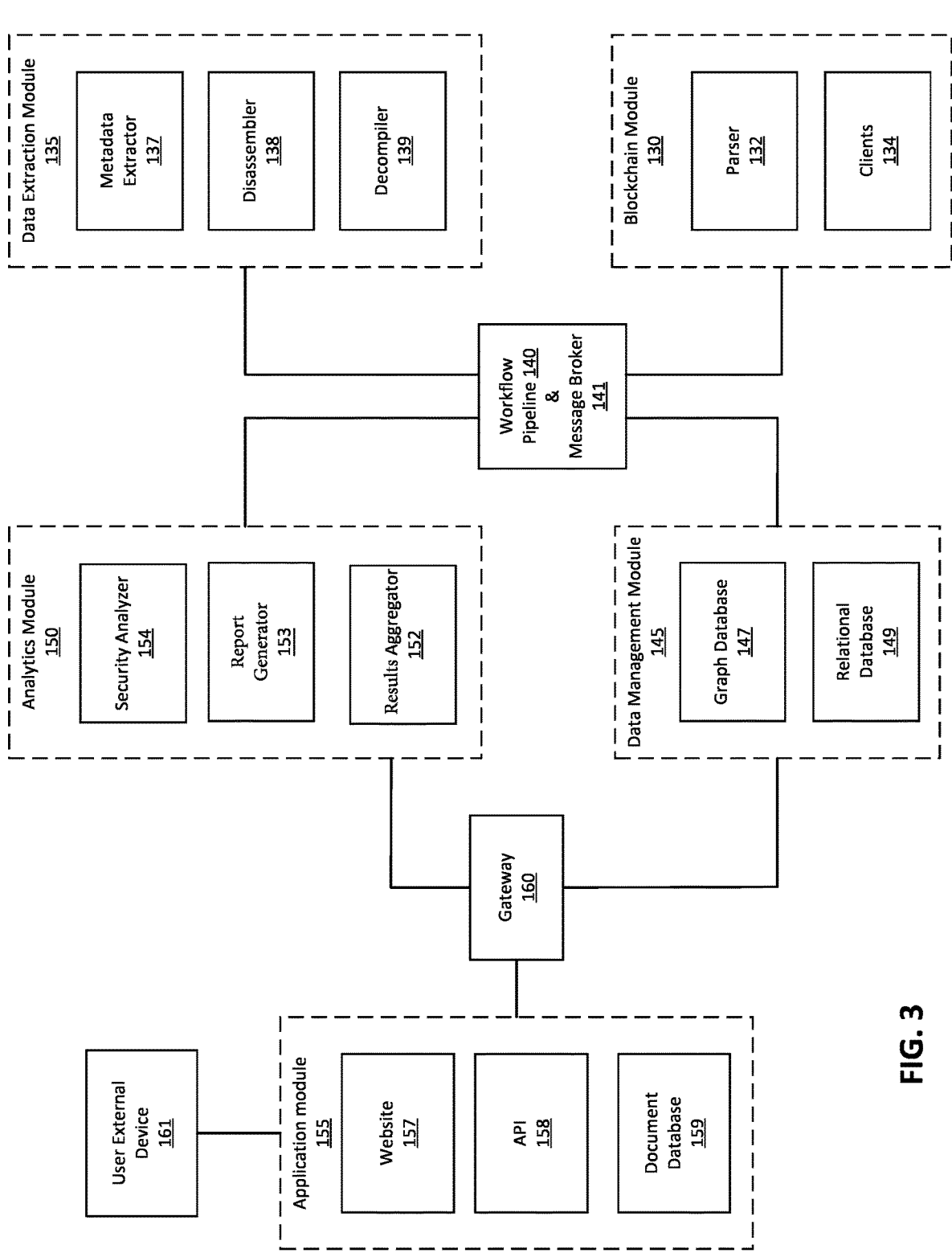
FIG. 3 illustrates an example embodiment of a smart contracts security auditing model, according to embodiments of the present disclosure.

FIG. 3 illustrates an example embodiment of the smart contracts auditing model 108, according to embodiments of the present disclosure. The smart contracts auditing model 108 includes a blockchain module 130, which includes a parser and at least one client device 134. The client devices 134, one for each blockchain under assessment, may be peer-to-peer clients that download and synchronize each blockchain's raw data. The parser 132 may extract, transform, and arrange raw blockchain data into a unified format suitable for storage by the data management module 145 for use in analysis. The data management module 145 may include storage of formatted blockchain data. The data management module 145 may include a relational database 149 and a graph database 147 in order for users to query different smart contracts for analysis. These databases 147, 149 may be queried in a way that user-defined functions enable the execution of specialized blockchain tasks used in the analytics module 150. The smart contracts auditing model 108 may also include a data extraction module 135 that contains a metadata extractor 137 for extracting the metadata of extracted smart contracts. In various embodiments, these metadata include the compiler version, the source code (if available), and the bytecode. The bytecode is then disassembled and decompiled by a disassembler and decompiler respectively resulting in an intermediary representation that is human-readable.

The smart contracts auditing model 108 may also include an analytics module 150. In various embodiments, the analytics module 150 contains more than one security analyzer 154, which may be integrated into a security scanner assembly. The security analyzers 154 may be either static, dynamic, or a combination of the two. These security analyzer 154 may be scanners used to analyze the vulnerabilities of a specific smart contract and produce raw security reports.

Additionally, the analytics module 150 includes an aggregator 152, which aggregates the output of the security analyzers 154 (i.e. the raw security reports) for a given smart contract. The analytics module 150 also includes a report generator 153 that parses and classifies the reports into categories of vulnerabilities into the reports according to the results aggregator 152, which may include one or more of a rules-based expert system and an ensemble learning-based model, and may enrich these reports with operational metrics, such as a smart contracts security score. Additionally the analytics module 150 may allow for the performance of graph analysis of blockchain transactions, with addresses modeled as nodes and transactions as weighted edges.

The blockchain module 130, the data management module 145, the data extraction module 135, and the analytics module 150 may communicate and operate with each other using a workflow pipeline 140, and a message broker 141 which may ensure that proper prioritization and deprioritization of messages between the components of the smart contracts auditing model 108 for proper functioning of the smart contracts auditing system 102.

The smart contracts auditing model 108 may also include an applications module 155. The applications module 155 may include a website 157 to which a user external device 161 connects to select or search different smart contracts for analysis and see aggregated security scores as well as trace and visualize relevant transactions using the smart contract. The applications may also include an API 158 which may service the website 157 and in addition, provide a stand-alone, on-demand smart contact security auditing application, which allows users to send associated smart contracts' bytecode or source code and receive a detailed security analysis, including a smart contracts security score, all in a matter of minutes.

The smart contracts auditing model 108 may also include a gateway 160, such as a gateway microservice, that interaction between the application module 155 and the rest of the smart contracts auditing model 108 (e.g. uploading bytecode for analysis). Additionally, the applications module 155 may include a document database 159 to store previously run security reports and other data.

Figure 4:
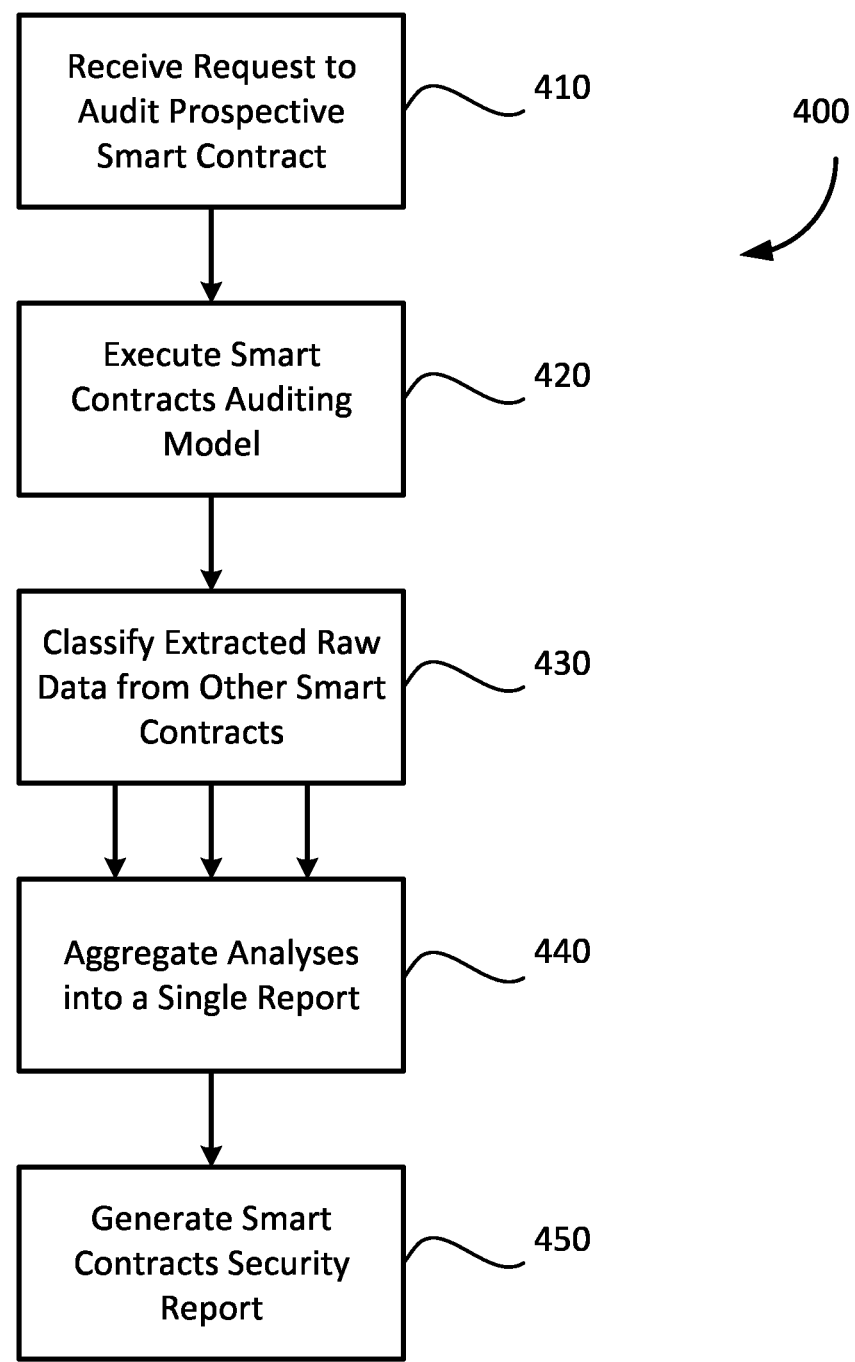
FIG. 4 is a flowchart of an example method for smart contract security auditing, according to embodiments of the present disclosure.

FIG. 4 is a flowchart of an example method 400 for smart contract security auditing, according to embodiments of the present disclosure. Method 400 begins at block 410, where the system receives a request from a client device identifying a prospective smart contract to audit. In various embodiments, the prospective smart contract may already be deployed in a blockchain, or may not yet be deployed (e.g., allowing developers to spot and solve issues before deployment to a blockchain).

At block 420, the system executes a smart contracts auditing model to extract extracting raw data from at least one blockchain. In various embodiments, the raw data extracted from the at least one blockchain include code and state data for at least one other smart contract stored in the at least one blockchain and metadata for whether the other smart contract has been exploited in the past. These data are compared against known vulnerability to identify when a prospective smart contract includes identical or similar code to other smart contracts known to have vulnerabilities, whether exploited or otherwise.

The auditing model parses raw smart contract data to extract metadata, which include but are not limited to the smart contract's bytecode-specific properties, like compiler version, token information, proxy implementation. Each bytecode is then disassembled and decompiled into an intermediary representation that is human-readable.

At block 430, the system uses at least two security analyzers to classify the extracted raw data. Multiple security analyzers (e.g., scanners, verifiers) are run against each contract's bytecode and source code (if available) and produce raw analysis results. In various embodiments, each of the security analyzers may independently identify various vulnerabilities in the identified smart contract under audit based on similar smart contracts that were previous identified with the same vulnerabilities. In various embodiments, the similarity may be based on the code contained in the smart contract, the model of blockchain that the smart contract is stored (or to be stored) in, various state data (including identified parties to the smart contract), and combinations thereof. In various embodiments, the analyses generated by the at least two security analyzers include categorizations that the vulnerabilities are parses and classified into, which may include, reentrancy, timestamp dependencies, integer overflow issues, integer underflow issues, unchecked call return values, arithmetic issues, and the inclusion of parity wallets.

At block 440, the system uses an aggregator to aggregate the separate analyses into a single report. In various embodiments, the aggregator is a rules-based expert system that may aggregate the separate analyses into a single report to account for any discrepancies or overlap between the two or more analyses performed by the respective two or more security analyzers (per block 430). In some embodiments, in addition to or alternatively to an aggregator of a rules-based expert system, the system uses an aggregator of an ensemble learning-based system executing one or more ensemble learning algorithms to aggregate the separate analyses.

In various embodiments, the aggregator may weight each identified vulnerability according to a severity for an associated vulnerability category to generate the smart contracts security score. For example, a first prospective smart contract with one "high severity" integer overflow vulnerability may be weighted as equally at risk for exploitation as a second prospective smart contract with two "medium severity" unchecked call return value issues according to the respective smart contracts security scores.

As analysis and aggregation requires considerable time, mostly due to the security analyzers, the aggregator may use a large language model (LLM) specialized for code (e.g., rather than natural language) that is trained on existing audit reports to auto-generate new reports for new contracts. Reports generated by the aggregator may, in turn, be identified by users as positive or negative training examples that are used to update the LLM for subsequent use to quickly generated aggregated reports with increasing accuracy and relevancy to users over time.

The aggregator may enrich the report with operational data, such as an explainable security score, vulnerability severity levels, etc. In embodiments using an ensemble learning-based aggregator, these "snap" audit reports are eventually expanded by the ensemble learning-based aggregator, if needed.

At block 450, the system generates a smart contracts security report from the aggregated output for the smart contract under audit. This security report includes a smart contracts security score, and may include various visualizations (e.g., a pie chart or other visual breakdown) for the counts of various vulnerabilities discovered during the audit. For example, The summary represents analytical information about the smart contract, including but not limited to an explainable security score, whether the smart contract is a proxy, and if so, what pattern does the proxy implement, whether the smart contract's bytecode is unique or the bytecode has been seen before on the blockchain with different levels of similarity, and if so, with which other smart contracts. The vulnerabilities include a detailed breakdown of detected vulnerabilities by several factors, including but not limited to the severity level, number of detected incidents, frequency across contracts (i.e., prominence), and the corresponding smart contract Weakness Classifications (SWCs). Finally, the code consists of the smart contract's bytecode, as extracted from the blockchain, and the disassembled and decompiled version thereof, which are used for different kinds of security analyses, along with other higherlevel representations with Virtual Machine (VM) runtime information (e.g., function call graph, storage state sequence, VM event logs).

Method 400 may then conclude.

Certain terms are used throughout the description and claims to refer to particular features or components. As one skilled in the art will appreciate, different persons may refer to the same feature or component by different names. This document does not intend to distinguish between components or features that differ in name but not function.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof. For avoidance of doubt, the phrase "at least one of A, B, and C" shall not be interpreted to mean "at least one of A, at least one of B, and at least one of C".

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

What is claimed is:

1. A smart contracts auditing system, comprising:

a processor, and a memory storing instructions, that when executed by the processor, perform operations, including:

receiving a request to audit a prospective smart contract;

executing a smart contracts auditing model;

extracting raw data from at least one blockchain using the smart contracts auditing model;

analyzing the raw data using at least two security analyzers;

aggregating outputs from the at least two security analyzers according to an aggregator; and generating a smart contracts security report from the outputs as aggregated for the prospective smart contract, which includes a smart contracts security score, wherein the at least two security analyzers analyze the raw data by parsing and classifying the raw data into one or more vulnerability categories, wherein the smart contracts security report includes a visual breakdown of vulnerabilities from the prospective smart contract identified according to the one or more vulnerability categories, wherein the smart contracts auditing model includes an applications module, and wherein the applications module is configured to communicate with at least one other module of the smart contracts auditing model using a workflow pipeline and a message broker, wherein the smart contracts auditing model includes a data management module, wherein the data management module includes a relational database and a graph database, and wherein the data management module is configured to allow a user to query different smart contracts for analysis, and wherein the smart contracts auditing model includes a data extraction module, wherein the data extraction module includes a metadata extractor, a disassembler, and a decompiler, wherein bytecode of metadata of extracted smart contracts is dissembled by the disassembler and decompiled by the decompiler resulting in an intermediary representation that is human-readable.

2. The system of claim 1, wherein the raw data extracted from the at least one blockchain include code and state data for at least one other smart contract stored in the at least one blockchain.

3. The system of claim 1, wherein the one or more vulnerability categories include:

reentrancy;

timestamp dependencies;

integer overflow;

integer underflow;

uncheck call return values;

arithmetic issues; and inclusion of parity wallets.

4. The system of claim 1, wherein each identified vulnerability is weighted according to a severity for an associated vulnerability category to generate the smart contracts security score.

5. The system of claim 1, wherein the prospective smart contract is not yet deployed in the at least one blockchain.

6. A method, comprising:

receiving a request to audit a prospective smart contract;

executing a smart contracts auditing model;

extracting raw data from at least one blockchain using the smart contracts auditing model;

analyzing the raw data using at least two security analyzers;

aggregating outputs from the at least two security analyzers according to an aggregator; and generating a smart contracts security report from the outputs as aggregated for the prospective smart contract, which includes a smart contracts security score, wherein the at least two security analyzers analyze the raw data by parsing and classifying the raw data into one or more vulnerability categories, wherein the smart contracts security report includes a visual breakdown of vulnerabilities in the prospective smart contract identified according to the one or more vulnerability categories, wherein the smart contracts auditing model includes an applications module, and wherein the applications module is configured to communicate with at least one other module of the smart contracts auditing model using a workflow pipeline and a message broker, wherein the smart contracts auditing model includes a data management module, wherein the data management module includes a relational database and a graph database, and wherein the data management module is configured to allow a user to query different smart contracts for analysis, and wherein the smart contracts auditing model includes a data extraction module, wherein the data extraction module includes a metadata extractor, a disassembler, and a decompiler, wherein bytecode of metadata of extracted smart contracts is dissembled by the disassembler and decompiled by the decompiler resulting in an intermediary representation that is human-readable.

7. The method of claim 6, wherein the raw data extracted from the at least one blockchain include code and state data for at least one other smart contract stored in the at least one blockchain.

8. The method of claim 6, wherein the one or more vulnerability categories include:

reentrancy;

timestamp dependencies;

integer overflow;

integer underflow;

uncheck call return values;

arithmetic issues; and inclusion of parity wallets.

9. The method of claim 6, wherein each identified vulnerability is weighted according to a severity for an associated vulnerability category to generate the smart contracts security score.

10. The method of claim 6, wherein the prospective smart contract is not yet deployed in the at least one blockchain.

11. A non-transitory computer readable storage device including instructions that, when executed by a processor, perform operations including:

receiving a request to audit a prospective smart contract;

executing a smart contracts auditing model;

extracting raw data from at least one blockchain using the smart contracts auditing model;

analyzing the raw data using at least two security analyzers;

aggregating outputs from the at least two security analyzers according to an aggregator; and generating a smart contracts security report from the outputs as aggregated for the prospective smart contract, which includes a smart contracts security score, wherein the at least two security analyzers analyze the raw data by parsing and classifying the raw data into one or more vulnerability categories, wherein the smart contracts security report includes a visual breakdown of vulnerabilities identified from the prospective smart contract according to the one or more vulnerability categories, wherein the smart contracts auditing model includes an applications module, and wherein the applications module is configured to communicate with at least one other module of the smart contracts auditing model using a workflow pipeline and a message broker, wherein the smart contracts auditing model includes a data management module, wherein the data management module includes a relational database and a graph database, and wherein the data management module is configured to allow a user to query different smart contracts for analysis, and wherein the smart contracts auditing model includes a data extraction module, wherein the data extraction module includes a metadata extractor, a disassembler, and a decompiler, wherein bytecode of metadata of extracted smart contracts is dissembled by the disassembler and decompiled by the decompiler resulting in an intermediary representation that is human-readable.

12. The device of claim 11, wherein the raw data extracted from the at least one blockchain include code and state data for at least one other smart contract stored in the at least one blockchain.

13. The device of claim 11, wherein the one or more vulnerability categories include:

reentrancy;

timestamp dependencies;

integer overflow;

integer underflow;

uncheck call return values;

arithmetic issues; and inclusion of parity wallets.

14. The device of claim 11, wherein each identified vulnerability is weighted according to a severity for an associated vulnerability category to generate the smart contracts security score.

* * * * *